United States Patent

Shibukawa et al.

[11] Patent Number: 5,936,323
[45] Date of Patent: Aug. 10, 1999

[54] PERMANENT MAGNET ROTATION TYPE ROTARY MACHINE AND MANUFACTURING METHOD THEREOF

[75] Inventors: Suetaro Shibukawa; Keiji Oda; Kiyoshi Hirano; Yoshikazu Kadowaki, all of Hitachinaka; Fumio Tajima, Juuou-machi, all of Japan

[73] Assignees: Hitachi, Ltd.; Hitachi Car Engineering Co., Ltd., both of Japan

[21] Appl. No.: 08/871,888

[22] Filed: Jun. 9, 1997

[30] Foreign Application Priority Data

Jun. 7, 1996 [JP] Japan .................................. 8-145462

[51] Int. Cl.[6] .................................................. H02K 21/12
[52] U.S. Cl. .......................... 310/156; 310/251; 310/262; 310/43; 310/152
[58] Field of Search ..................... 310/156, 251, 310/262, 43, 152

[56] References Cited

U.S. PATENT DOCUMENTS 4,954,736  9/1990  Kawamoto et al. ..................... 316/156
5,369,325  11/1994  Nagate et al. ........................... 310/156

FOREIGN PATENT DOCUMENTS

63-140645  3/1988  Japan .
64-64548   3/1989  Japan .
5-199685   8/1993  Japan .

*Primary Examiner*—Nestor Ramirez
*Assistant Examiner*—Thanh Lam
*Attorney, Agent, or Firm*—Evenson, McKeown, Edwards & Lenahan, P.L.L.C.

[57] ABSTRACT

Plural magnet insertion holes are provided at a vicinity of an outer peripheral of a laminated rotor core toward a circumferential direction and extend toward an axial direction. The magnet insertion holes are divided into plural toward the axial direction and each of the plural magnet insertion holes is shifted at a predetermined angle toward a circumferential direction. The permanent magnet is arranged in the magnet insertion hole and the permanent magnet is fixed to the laminated rotor core through a clearance fill-up agent. The cogging torque is reduced and the reduction in noises is improved and a permanent magnet rotation type rotor constituted by low cost materials is prevented from damaging or destroying by the centrifugal force.

10 Claims, 6 Drawing Sheets

PERMANENT MAGNET ROTATION TYPE ROTARY MACHINE AND MANUFACTURING METHOD THEREOF

BACKGROUND OF THE INVENTION:

The present invention relates to a permanent magnet rotation type rotary machine and a manufacturing method of a permanent magnet rotation type rotary machine and particularly to a permanent magnet rotation type rotary machine suitable for use in high rotation and having high reliability property and a manufacturing method of a permanent magnet rotation type rotary machine.

In a conventional rotary machine having a permanent magnet rotor, generally to reduce cogging torque the permanent magnet rotor is formed with a skew structure. For example, as shown in Japanese laid-open patent publication No. 140,645/1988 and Japanese laid-open patent publication No. 64,548/1989, a laminated rotor core is divided into plural number toward a lamination direction in company with a permanent magnet and each of divided rotor cores is assembled by sifting in a step form with a predetermined angle.

Further, in Japanese laid-open patent publication No. 199,685/1993, a permanent magnet is divided into plural number and each of the divided permanent magnets is attached to a surface of a laminated rotor core by shifting in a step form with a predetermined angle.

However, in the former two conventional cases of the permanent magnet rotor, a rotation angle between mutual rotors arranged in parallel form needs to maintain at constant and the assembling and fixture of the permanent magnet rotor must carry out with delicacy.

Therefore, high productivity property for the permanent magnet rotor does not necessarily obtain and as a result there is a fear to bring about a high cost permanent magnet rotor structure.

On the other hand, in the latter conventional case of the permanent magnet rotor, each of the divided permanent magnets which has installed to a surface of the laminated rotor core by shifting becomes a cause of noises during the high speed rotation. Further, during the high speed rotation, a large stress generates according to a centrifugal force of the permanent magnet, and when the laminated rotor core is constituted with low cost material members, there is a possibility of an occurrence of the damage or the destroy in the laminated rotor core.

SUMMARY OF THE INVENTION

An object of the present invention is to provide a permanent magnet rotation type rotary machine and a manufacturing method thereof wherein in the permanent magnet rotation type rotary machine the cogging torque can be reduced and the reduction of noises can be attained and the permanent magnet rotation type rotary machine can be suited for the high speed rotation.

Another object of the present invention is to provide a permanent magnet rotation type rotary machine and a manufacturing method thereof wherein in the permanent magnet rotation type rotary machine the damage or the destroy of a laminated rotor core constituted with low coast material members can not generate according to the centrifugal force and the permanent magnet rotation type rotary machine can be suited for the high speed rotation.

According to the present invention, a permanent magnet rotation type rotary machine comprises a permanent magnet rotor in which a permanent magnet is buried in a laminated rotor core and a stator arranged concentrically to the permanent magnet rotor through a rotation clearance.

The permanent magnet rotation type rotary machine comprises further the permanent magnet rotor core has plural magnet insertion holes, each of the plural magnet insertion holes extends on a surface layer portion of the permanent magnet rotor core toward an axial direction and is provided along to a circumferential direction.

The plural magnet insertion holes are divided into plural toward the axial direction and each of the plural magnet insertion holes is provided to shift with a predetermined angle toward the circumferential direction, and the permanent magnet is fixed into the magnet insertion hole through a clearance fill-up agent.

According to the present invention, it is preferable to form a ratio Sc/Sm between a cross-section area Sc of the magnet insertion hole and a cross-section area Sm of the permanent magnet having a range of 1.02–1.15.

According to the present invention, it is preferable to make the viscosity degree of the clearance fill-up agent being 5,000–30,000 cps at a normal temperature. According to the present invention, the clearance fill-up agent is a normal temperature hardening type high polymer material.

According to the present invention, a permanent magnet rotation type rotary machine comprises a permanent magnet rotor in which a permanent magnet is buried in a laminated silicon steel plate, and a stator arranged concentrically to the permanent magnet rotor through a rotation clearance, the maximum peripheral speed of the permanent magnet rotor being more than 50 m/s.

The permanent magnet rotation type rotary machine comprises further the permanent magnet rotor core having plural magnet insertion holes, the plural magnet insertion holes extend on a surface layer portion of the permanent magnet rotor core toward an axial direction and are provided along to a circumferential direction.

The magnet insertion holes are divided into plural toward the axial direction and each of the plural divided permanent magnet insertion holes is provided to shift with a predetermined angle with the circumferential direction.

A ratio Sc/Sm between a cross-section area Sc of the magnet insertion hole and a cross-section area Sm of the permanent magnet has a range of 1.02–1.15, and the permanent magnet is arranged in the magnet insertion hole, the permanent magnet is fixed to the laminated rotor core through a clearance fill-up agent.

The clearance fill-up agent comprises a high polymer material and fills-up a clearance between the magnet insertion hole and the permanent magnet rotor core, and minimum thickness of an outer peripheral portion of the laminated rotor core at a portion on which the magnet insertion hole is provided is more than 1 mm.

According to present invention, in a method of manufacturing a permanent magnet rotation type rotary machine which comprises a permanent magnet rotor in which a permanent magnet is buried in a laminated rotor core and a stator arranged concentrically to the permanent magnet rotor.

The permanent magnet rotor comprises plural core plates laminated toward an axial direction, plural magnet insertion holes are formed at a surface layer portion of a side being opposite to the stator along to a rotation direction and extend toward the axial direction, and the permanent magnet is buried and fixed in the magnet insertion holes.

The method of manufacturing the permanent magnet rotation type rotary machine comprises of steps, step of inserting one plate of the divided permanent magnets in the magnet insertion hole extending toward the axial direction, and step of pouring a suitable amount of a clearance fill-up agent, and step of repeating in order an insertion of another plate of the divided permanent magnets.

The method of manufacturing the permanent magnet rotation type rotary machine comprises of steps further, step of flowing homogeneously the clearance fill-up agent into a clearance which is generated in a space of the permanent magnet and a magnet insertion hole of the rotor core by pumping operation which occurs during an insertion of the plural divided permanent magnets into the hole of the rotor core, and step of fixing the permanent magnet.

According to the present invention, the permanent magnet is divided into plural and by angle-shifting at optional toward the peripheral direction the skew structure can obtain, as a result the reduction in the cogging torque can be attained and aloso the reduction in the noises can be attained.

Further, the clearance fill-up agent for burying the clearance formed between the permanent magnet and the rotor core is made to flow homogeneously into the clearance, the permanent magnet does not directly contact to the rotor core, accordingly the increase in stress due to the centrifugal force according to the permanent magnet can be prevented.

As a result, finally it is possible to provide the rotary machine for use in the high speed rotation where the low material member is used as the laminated rotor core.

DESCRIPTION OF THE INVENTION

Hereinafter, one embodiment of a rotor of a rotary machine having a permanent magnet rotor according to the present invention will be explained referring to the drawings.

Figure 1:
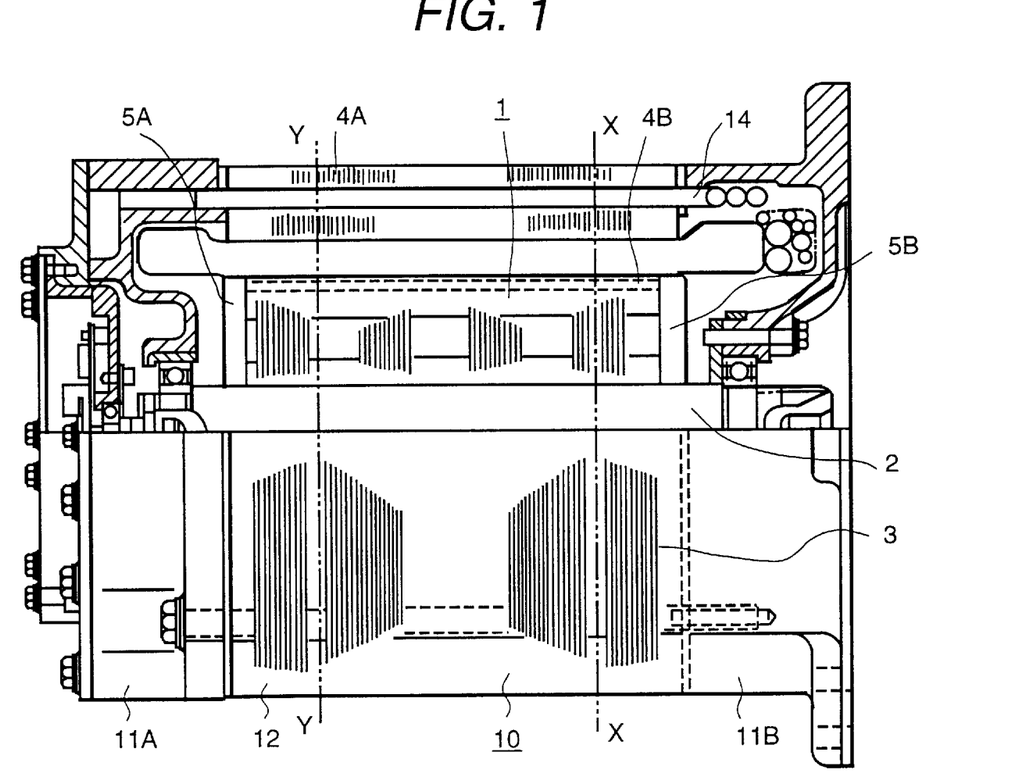
FIG. 1 is a longitudinal cross-sectional view showing of one embodiment of a rotary machine having a permanent magnet type rotor according to the present invention.
Figure 2:
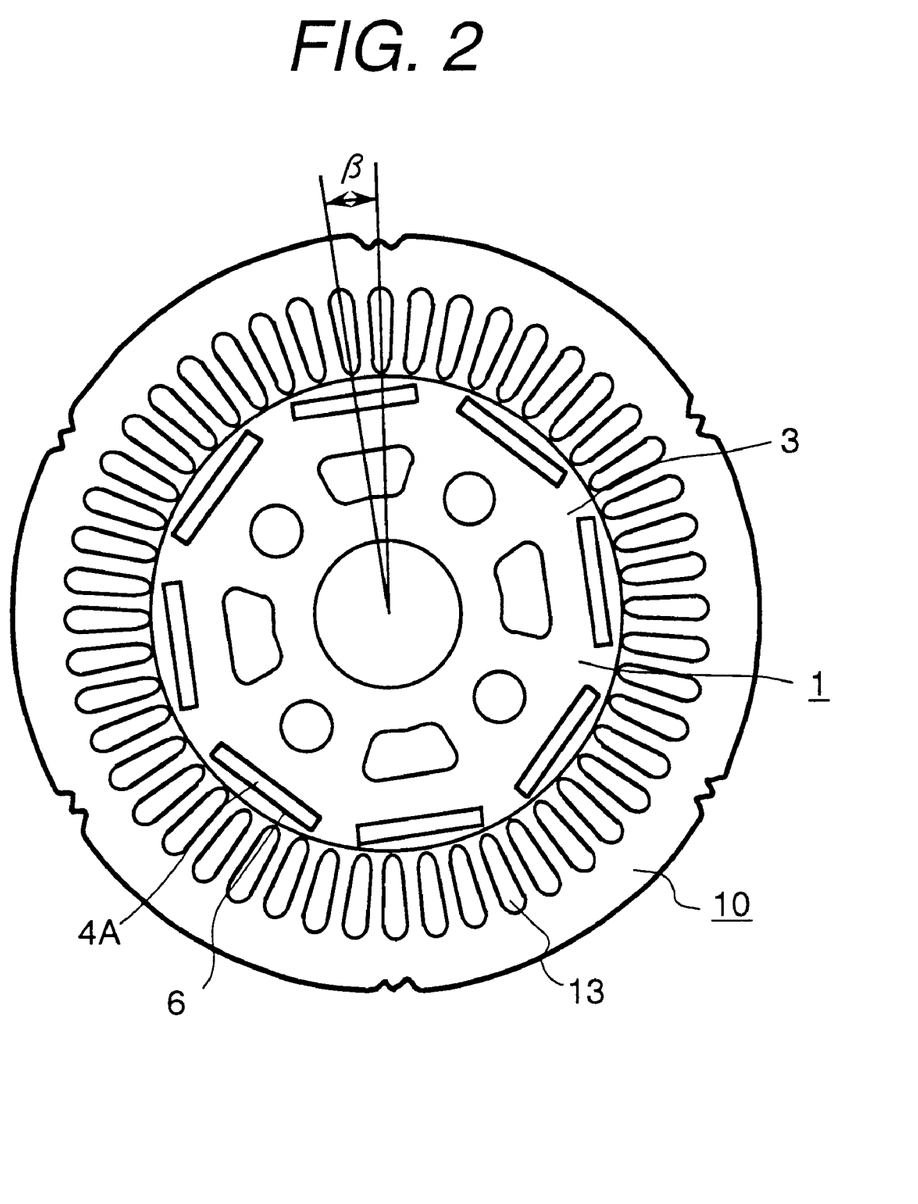
FIG. 2 is a cross-sectional view taken along to a line X—X of FIG. 1.
Figure 3:
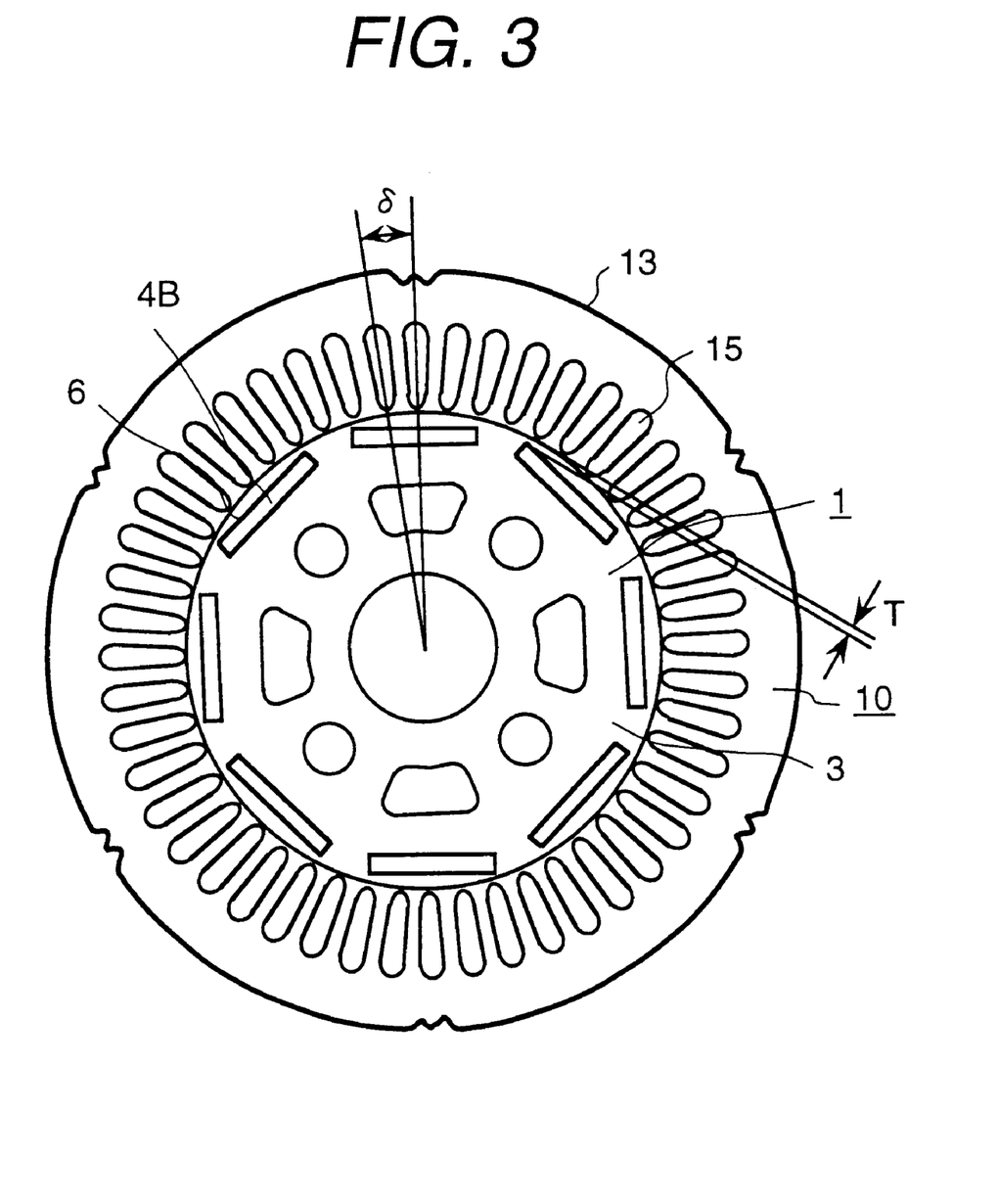
FIG. 3 is a cross-sectional view taken along to a line Y—Y of FIG. 1.

FIG. 1 is a longitudinal cross-sectional view showing of one embodiment of a rotary machine comprised of a permanent magnet rotor 1 and a stator 10 having a permanent magnet rotation type rotor according to the present invention, FIG. 2 is a cross-sectional view taken along to a line X—X of FIG. 1, and FIG. 3 is a cross-sectional view taken along to a line Y—Y of FIG. 1.

The rotary machine according to the present invention is used in the high speed rotation where the maximum peripheral speed of the permanent magnet rotor 1 is more than 50 m/s. For example, the rotary machine is a permanent magnet rotation type rotary machine suitable for use in a driving power supply of an electric vehicle wherein a battery serves as a power supply.

The permanent magnet rotor 1 comprises mainly a shaft 2, a laminated rotor core 3, a permanent magnet 4 (4A, 4B) and an end ring 5 (5A, 5B). Plural core plates of the laminated rotor core 3 are laminated toward an axial direction and are fixed to the shaft 2.

The permanent magnet 4 (4A, 4B) is divided into plural number (in this embodiment, the permanent magnet 4 is divided into two number of a permanent magnet 4A and a permanent magnet 4B) toward the axial direction and fixed to the laminated rotor core 3.

The end ring 5 (5A, 5B) is provided on both outer side ends of the laminated rotor core 3 and the permanent magnet 4. Both end portions of the shaft 2 are bearing-supported with an end bracket 11 (11A, 11B). The stator 10 comprises a stator coil 12, a stator core 13 and a cooling pipe 14 and the stator 10 is arranged concentrically with the rotor core 1 through a rotation clearance.

As a material member for the laminated rotor core 3, a low cost material member such as a silicon steel plate is used.

As shown in FIG. 2, at a vicinity of an outer periphery of the laminated rotor core 3 or at a surface layer portion of the laminated rotor core 3 of the permanent magnet rotor 1, plural magnet insertion holes 6 are provided with equal intervals along to a circumferential direction. The magnet insertion holes 6 extend toward the axial direction and penetrate the laminated rotor core 3.

The plural permanent magnets 4A are arranged in the magnet insertion holes 6 and two adjacent permanent magnets 4A have a reversal polarity each other at the circumferential direction.

As shown in FIG. 3, a difference between an outer side end of the magnet insertion hole 6 and an outer periphery of the laminated rotor core 3, namely a thickness T of a vicinity of the outer peripheral portion of the laminated rotor core 3 or the surface layer portion of the laminated rotor core 3 where the magnet insertion holes 6 are provided on, is necessary to be at least more than 1 mm from an aspect of the strength, desirably to be about 2 mm degree.

A dimension size of the magnet insertion hole 6 is a little larger than a dimension size of the permanent magnet 4. In a minute clearance formed between the permanent magnet 4 and the magnet insertion hole 6, a clearance fill-up agent 7 is filled up and this clearance fill-up agent 7 can serve as an adhesion agent.

Accordingly, each of the permanent magnets 4A is buried in the magnet insertion hole 6 and is integrated with the laminated rotor core 3. As the clearance fill-up agent 7, for example, normal temperature hardening type epoxy resin is suited for. A winding slot 15 is provided along to an inner periphery of the stator coil 12 with an interval of an angle of β.

As clearly understood from a comparison the structure shown in FIG. 2 with the structure shown in FIG. 3, the permanent magnet 4A and the permanent magnet 4B are divided into two at the axial direction.

The permanent magnet 4A and the permanent magnet 4B has a positional relationship, where the permanent magnet 4A and the permanent magnet 4B are shifted with a predetermined angle of δ along to the circumferential direction of the laminated rotor core 3, and are fixed to the laminated rotor core 3. As one example, the shift angle of δ equals to an interval of β of the winding slot 15.

Since the permanent magnets 4 are divided into plural toward the axial direction and the permanent magnets 4 are angular-shifted voluntarily toward the circumferential direction, a skew effect can be obtained. Accordingly, it is possible to reduce the cogging torque and to reduce the noises. The shift angel of δ can form 0.5–2 slots degree of the stator 10 in a whole permanent magnet 4 of the permanent magnet rotor 1.

Figure 5A:
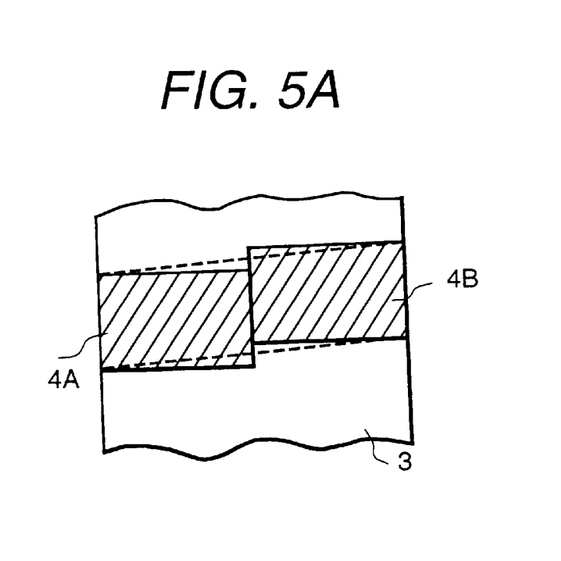
FIG. 5A is a plan view showing a skew structure of a permanent magnet structure of the above stated embodiment according to the present invention.
Figure 5B:
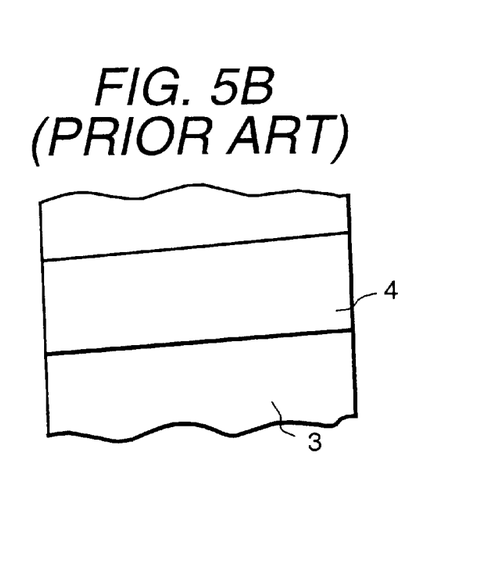
FIG. 5B is a plan view showing a skew structure of a permanent magnet structure according to the prior art.

Hereinafter, the skew effect of the above stated embodiment according to the present invention will be explained. FIG. 5A shows one embodiment of two divided permanent magnet structure according to the present invention. FIG. 5B shows one example of a continuous skew structure having only single continuous permanent magnet according to the prior art.

In the structure of the prior art shown in FIG. 5B, by forming the skew structure the magnetic flux which intersects with the stator winding gradually increase or gradually decrease in accompany with the rotation of the permanent magnet rotor.

On the other hand, in the structure of the present invention shown in FIG. 5A, the magnetic flux which intersects with the stator winding 15 increase in step forms or decrease in step forms as according as a number of division of the permanent magnet 4 and a space magnetic field substantially can act to be equivalence with that of prior art and can generate the skew effect similar to the prior art shown in FIG. 5B.

In the above stated embodiment according to the present invention, since the clearance fill-up agent 7 for burying the clearance between the permanent magnet 4 and the magnet insertion hole 7 of the rotor core 3 can flow, the increase in stress due to the centrifugal force by the permanent magnet 4 can be prevented. Hereinafter, the above stated fact will be explained.

First of all, to secure the maintenance in strength the minute clearance formed between the permanent magnet 4 and the magnet insertion hole 6 is desirable to be equal at every portions.

However, in the permanent magnet having the single continuous skew structure according to the prior art shown in FIG. 5B, it is very difficult to homogeneously flow the clearance fill-up agent 7 into the minute clearance formed between the permanent magnet 4 and the magnet insertion hole 6.

As a result, it occurs case where the permanent magnet 4 contacts directly to the rotor core 3 and the stress according to the centrifugal force by the permanent magnet acts on the rotor core 3 and this may invite the cause of the damage or the destroy of the permanent magnet 4.

However, when one embodiment of the permanent magnet 4 is divided into according to the present invention, it can easily and homogeneously flow the clearance fill-up agent 7 into the clearance formed between the permanent magnet 4 and the magnet insertion hole 6 of the rotor core 3.

Figure 6A:
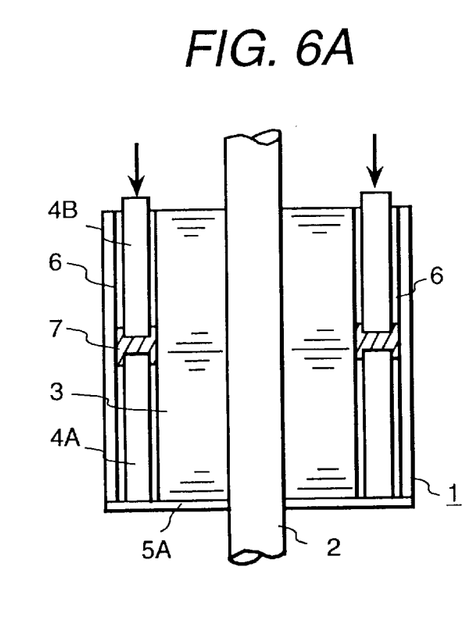
FIGS. 6A, 6B and 6C are process charts of one example of a manufacturing method of a rotor of the rotary machine according to the present invention.
Figure 6B:
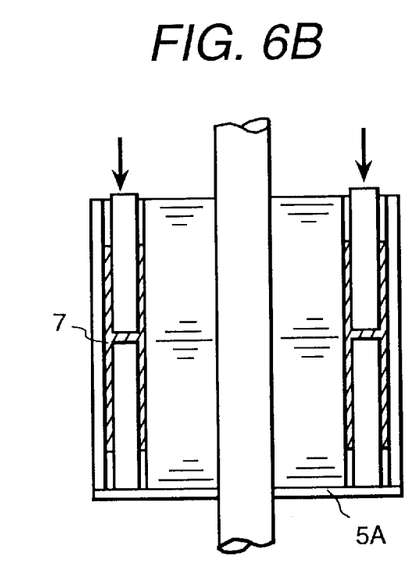
Figure 6C:
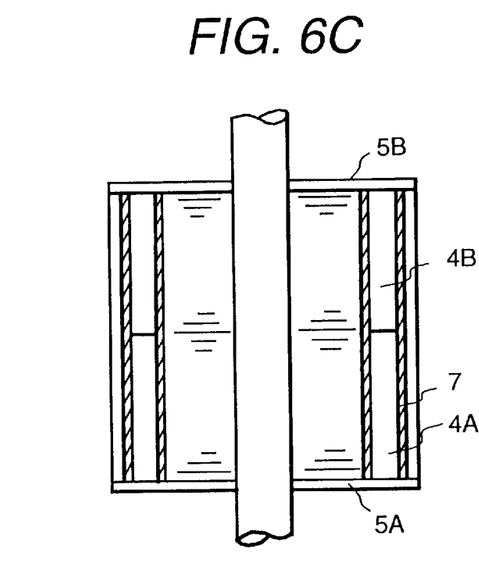

As means for realizing the above, one example of a manufacturing method of the permanent magnet rotor 1 of the rotary machine according to the present invention will be shown in FIG. 6A, FIG. 6B and FIG. 6C.

First of all, as shown in FIG. 6A, the end ring 5A and the laminated rotor core 3 are fixed to the shaft 2. Next, the permanent magnet rotor 1 is putted toward a longitudinal direction and one piece 4A of the plural divided permanent magnet 4 is inserted into the magnet insertion hole 6 of the laminated rotor core 3 which extends toward the axial direction along to the rotation direction.

Next, the clearance fill-up agent 7 having the suitable amount is poured at an upper end portion of one piece 4A of the permanent magnet 4, namely at a vicinity of a central portion of a height direction of the magnet insertion hole 6. After that another piece 4B of the permanent magnet 4 is inserted into the magnet insertion hole 6 of the laminated rotor core 3.

In this time, as shown in FIG. 6B, by the pumping operation which generates when the permanent magnet 4B is inserted in to the magnet insertion hole 6, the clearance fill-up agent 7 flows homogeneously into the clearance which is caused the space between the permanent magnets 4A and 4B and the magnet insertion holes 6 of the rotor core 3.

Namely, the clearance fill-up agent 7 flows homogeneously toward an upper and lower direction from the vicinity of the central portion of the magnet insertion holes 6.

The above stated operations are repeated successively at the magnet insertion holes 6 and the clearance fill-up agent 7 are made to flow homogeneously at a whole clearance formed between the permanent magnet 4 and the magnet insertion holes 6.

Finally, as shown in FIG. 6C, another end ring 5B is fixed and then the working is finished. In response to the length of the permanent magnet 4, the number of the permanent magnets 4 are varied as a result the flow of the clearance fill-up agent 7 can be homogenized.

Figure 4:
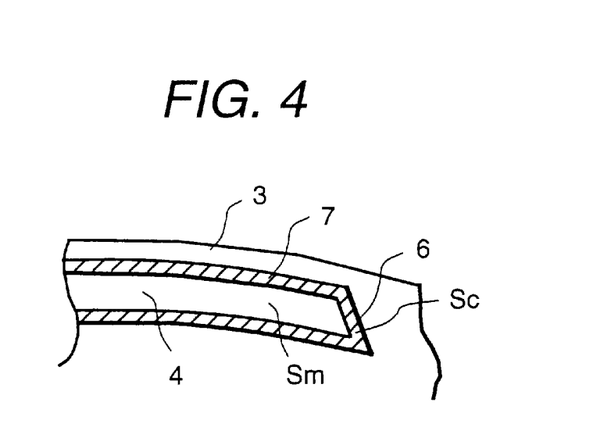
FIG. 4 is an essential portion enlarged view showing a relationship between a magnet insertion hole and a laminated rotor core of the above stated embodiment according to the present invention.

According to the results of the experimentation by the inventors, to flow homogeneously the clearance fill-up agent 7 in the clearance formed between the permanent magnet 4 and the magnet insertion holes 6, through the exterminations it was found out that it is desirable to be an area ratio Sc/Sm having 1.02–1.15. Such an area ratio Sc/Sm is one between a cross-section area Sm of the permanent magnet 4 shown in FIG. 4 and a cross-section area Sc of the magnet insertion hole 6 for burying the permanent magnet 4.

When the area ratio Sc/Sm is less than 1.02, it is necessary to be the viscosity degree of the clearance fill-up agent 7 less than 5,000 cps. On the other hand, when the area ratio Sc/Sm is more than 1.15, it is necessary to form largely the clearance as a result it may invite the lowering in performance of the rotary machine.

Further, taking into no special consideration to the laminating working for the rotor core 3, according to the exterminations by the inventors it was found out that the viscosity degree of the clearance fill-up agent 7 where the conventional method can adapt is 5,000–30,000 cps.

On the other hand, when the viscosity degree of the clearance fill-up agent 7 exceeds over 30,000 cps, the clearance fill-up agent 7 does not flow into a small clearance which does generate the lowering in performance in the rotary machine.

As stated in above, the clearance fill-up agent 7 for burying the clearance formed between the permanent magnet 4 and the magnet insertion holes 6 is flown homogeneously, since the permanent magnet 4 does not contact directly to the laminated rotor core 3, the increase in stress due to the centrifugal force by the permanent magnet 4 can be prevented.

As the position for providing the magnet insertion hole 6, it is desirable to provide at the vicinity of an outer periphery of the laminated rotor core 3 or the surface layer portion of the laminated rotor core 3 of the permanent magnet rotor 1 and also to provide a portion along to the circumferential direction.

FIGS. 7A, 7B, 7C, 7D and 7E show the results of the exterminations about the affect in which the positional relationship between the laminated rotor core 3 and the permanent magnet 4 affects to the strength of the laminated rotor core 3 according to the present invention and according to the comparison examples.

Figure 7A:
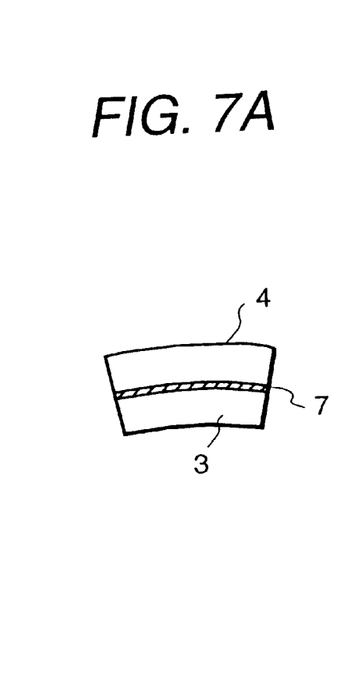
FIG. 7A is an explanatory view of the experimentation of an affect in which a positional relationship between a laminated rotor core and a permanent magnet influence to the strength of the laminated rotor core according to the comparison example.
Figure 7B:
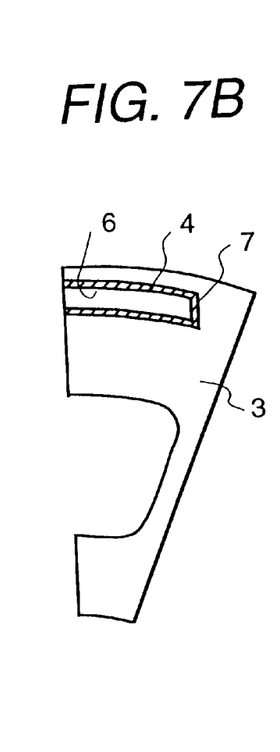
FIGS. 7B and 7C are explanatory views of the experimentation of an affect in which a positional relationship between a laminated rotor core and a permanent magnet influence to the strength of the laminated rotor core according to the present invention.

FIG. 7A shows the comparison example case where the permanent magnet 4 is arranged to adhere directly to an outer side of a ring form rotor core 3. FIG. 7B shows the present invention case where the permanent magnet 4 is inserted to a substantial arc form magnet insertion hole 6 which is provided toward the circumferential direction at the vicinity of the outer periphery of the rotor core 3 and the clearance is buried by the clearance fill-up agent 7 according to the present invention.

The thickness of the rotor core 3 at the outer side of the magnet insertion hole 6 is 2.0 mm and the thickness of the clearance fill-up agent 7 is 1.5 mm.

Figures 7C, 7D:
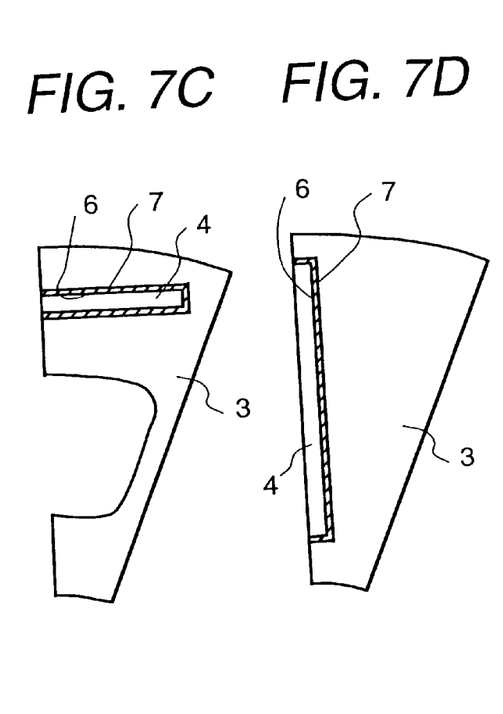
FIG. 7D and FIG. 7E are explanatory views of the experimentation of an affect in which a positional relationship between a laminated rotor core and a permanent magnet influence to the strength of the laminated rotor core according to the comparison examples.

FIG. 7C shows the present invention case where the permanent magnet 4 is inserted to a linear (a block) form magnet insertion hole 6 which is provided toward the circumferential direction at the vicinity of the outer periphery of the rotor core 3 and the clearance is buried by the clearance fill-up agent 7 according to the present invention.

FIG. 7D shows the comparison example case where the permanent magnet 4 is arranged to adhere at the radial form (repulsion) toward the radial direction of the rotor core 3, however the clearance is not buried by the clearance fill-up agent 7.

Figure 7E:
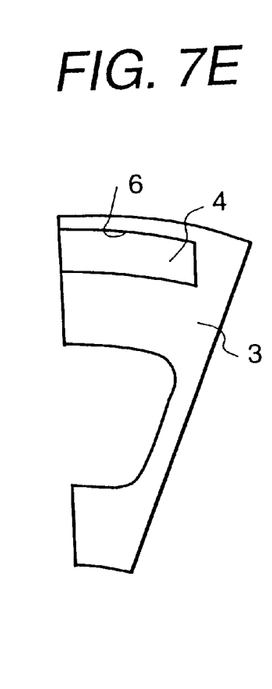

FIG. 7E shows the comparison example case where the permanent magnet 4 is inserted to a substantial arc form magnet insertion hole 6 which is provided toward the circumferential direction at the vicinity of the outer periphery of the rotor core 3, however the clearance is not buried according to the clearance fill-up agent 7.

Further, the peripheral speed of the rotor core 3 is 80 m/s. Further, the physical properties of the materials of the rotor core 3, the permanent magnet 4, and the clearance fill-up agent 7 are shown in Table 1.

TABLE 1 material properties values table

| component name | Young rate (kgf/mm$^2$) | Poison ratio | specific gravity (kgf/mm$^2$) |
| --- | --- | --- | --- |
| core | 2.1 × 10$^4$ | 0.30 | 7.83 × 10$^{-6}$ |
| magnet | 1.6 × 10$^4$ | 0.30 | 7.50 × 10$^{-6}$ |
| fill-up agent | 2.5 | 0.25 | 1.80 × 10$^{-6}$ |

The maximum stress and the variation amount generated in the laminated rotor core 3 are shown in Table 2.

TABLE 2 maximum stress and variation amount

| | Fig.7A ring | Fig.7B arc | Fig.7C block | Fig.7D repulsion | Fig.7E arc (no agent) |
| --- | --- | --- | --- | --- | --- |
| core maximum stress (kg/mm$^2$) | — | 17.6 | 24.8 | 35.7 | 21.4 |
| magnet maximum stress (kg/mm$^2$) | 8.5 | 2.2 | 3.3 | 0.7 | 8.5 |

As clearly understood from Table 2, the structure of the rotor core 3 shown in FIG. 7B according to the present invention has the smallest maximum stress and a superior construction from aspects of the permanent magnet maximum stress and the core variation amount. Further, the structure of the rotor core 3 shown in FIG. 7C has a superior characteristics ranks be next to the structure of the rotor core 3 shown in FIG. 7B.

The structure of the rotor core shown on FIG. 7A has no magnet insertion hole 6 and in this structure of the rotor core 3 the maximum stress acted on the permanent magnet 4 becomes large, accordingly when the rotary machine reaches to the high speed rotation it is a danger where the permanent magnet 4 may damage or destroy.

In the structure of the rotor core 3 shown in FIG. 7D, the maximum stress acted on the vicinity of the center portion of the rotor core 3 exceeds over due to the centrifugal force, accordingly when the rotary machine reaches to the high speed rotation it is a danger where the permanent magnet 4 may damage or destroy.

Further, in the structure of the rotor core 3 shown in FIG. 7E, since the clearance fill-up agent 7 does not exist in the magnet insertion hole 6 and the permanent magnet face-contacts to the rotor core 3, the maximum stress acted on the permanent magnet 4 becomes large, accordingly when the rotary machine reaches to the high speed rotation it is a danger where the permanent magnet 4 may damage or destroy.

As stated in above, according to the embodiments of the present invention, the permanent magnet 4 is divided into plural and by angle-shifting at optional toward the peripheral direction the skew effect can obtain, as a result the reduction in the cogging torque can be attained and the reduction in the noises can be attained.

Further, the clearance fill-up agent 7 for burying the clearance formed between the permanent magnet 4 and the rotor core 3 is flown homogeneously into the clearance, the permanent magnet 4 does not directly contact to the rotor core 3, accordingly the increase in stress due to the centrifugal force by the permanent magnet 4 can be prevented.

As a result, finally it is possible to provide the permanent magnet rotation rotary machine for use in the high speed rotation where the low material member is used as the laminated rotor core 3.

We claim:

1. A permanent magnet rotation type rotary machine comprises:

a permanent rotor in which plural permanent magnets are buried in a laminated rotor core; and a stator arranged concentrically to said permanent magnet rotor through a rotation space, wherein said permanent magnet rotor core has plural magnet insertion holes, each of said plural magnet insertion holes extends on a surface layer portion of said permanent magnet rotor core in an axial direction so as to be divided and is provided along a circumferential direction of the rotor core, each of said plural magnet insertion holes is provided to shift with a predetermined angle along the circumferential direction; and each of said plural magnets is fixed in each of said plural magnet insertion holes extending in the axial direction over two adjacent divided permanent magnet cores through a clearance fill-up agent.

2. A permanent magnet rotation type rotary machine according to claim 1, wherein an area ratio Sc/Sm between a cross-section area Sc of said magnet insertion hole and a cross-section area Sm of said permanent magnet is a range of 1.02–1.15.

3. A permanent magnet rotation type rotary machine according to claim 1, wherein viscosity degree of said clearance fill-up agent is 5,000–30,000 cps at a normal temperature.

4. A permanent magnet rotation type rotary machine according to claim 1, wherein said clearance fill-up agent is a normal temperature hardening type high polymer material.

5. A permanent magnet rotation type rotary machine comprises:

a permanent magnet rotor in which plural permanent magnets are buried in a laminated silicon steel plate; and a stator arranged concentrically to said permanent magnet rotor through a rotation space;

maximum peripheral speed of said permanent magnet rotor being more than 50 m/s, wherein a permanent magnet rotor core has plural magnet insertion holes, each of said plural magnet insertion holes extends on a surface layer portion of said permanent magnet rotor core in an axial direction so as to be divided and is provided along a circumferential direction of the rotor core, each of said plural magnet insertion holes is provided to shift at a predetermined angle toward the circumferential direction;

an area ratio Sc/Sm between a cross-section area Sc of said magnet insertion hole and a cross-section area Sm of aid permanent magnet is a range of 1.02–1.15; and each said plural permanent magnets is arranged in each of said plural magnet insertion holes extending in the axial direction over two adjacent divided permanent magnet cores, each of said plural permanent magnets is fixed to said laminated rotor core through a clearance fill-up agent, said clearance fill-up agent comprises a high polymer material and fills-up a clearance between each of said plural magnet insertion holes and said permanent magnet rotor core; and minimum thickness of an outer peripheral portion of said laminated rotor core at a portion for providing each of said plural magnet insertion holes is more than 1 mm.

6. An electric vehicle, comprising a permanent magnet rotation type rotary machine having a permanent rotor in which plural permanent magnet are buried in a laminated rotor core; and a stator arranged concentrically to said permanent magnet rotor through a rotation space, wherein said permanent magnet rotor core has plural magnet insertion holes, each of said plural magnet insertion holes extends on a surface layer portion of said permanent magnet rotor core in an axial direction so as to be divided and is provided along a circumferential direction of the rotor core, each of said plural magnet insertion holes is provided to shift with a predetermined angle toward the circumferential direction; and each of said plural magnets is fixed in each of said plural magnet insertion holes extending in the axial direction over two adjacent divided permanent magnet cores through a clearance fill-up agent, in which the machine is arranged to constitute a driving power supply of the electric vehicle.

7. In a method of manufacturing a permanent magnet rotation type rotary machine which comprises a permanent magnet rotor in which plural divided permanent magnets are buried in a laminated rotor core and a stator arranged concentrically to said permanent magnet rotor, said permanent magnet rotor comprises plural core plates laminated toward an axial direction, each of said plural magnet insertion holes is formed at a surface layer portion of a side being opposite to said stator along to a rotation direction and extends toward the axial direction, each of said plural divided permanent magnets is buried and fixed in said plural magnet insertion holes, wherein the method of manufacturing said permanent magnet rotation type rotary machine comprises of steps:

inserting one plate of said plural divided permanent magnet in each of said plural magnet insertion holes extending over two adjacent divided permanent magnet cores toward the axial direction;

pouring a suitable amount of a clearance fill-up agent in a clearance formed between each of said plural divided permanent magnets and said laminated rotor core; and repeating in order an insertion of another plate of said plural divided permanent magnets;

flowing homogeneously said clearance fill-up agent into said clearance which is generated in a space of each of said plural divided permanent magnets and each of said plural magnet insertion holes of said laminated rotor core by pumping operation which occurs during an insertion of each said plural divided permanent magnets into each of said plural magnet insertion holes of said laminated rotor core; and fixing each of said plural divided permanent magnets.

8. A method of manufacturing a permanent magnet rotation type rotary machine according to claim 7, wherein said clearance fill-up agent is a normal temperature hardening type high polymer material, and viscosity degree of said clearance fill-up agent is 5,000–30,000 cps.

9. In a method of manufacturing a permanent magnet rotation type rotary machine which comprises a permanent magnet rotor in which plural divided permanent magnets are buried in a laminated rotor core and a stator arranged concentrically to said permanent magnet rotor, said permanent magnet rotor comprises plural core plates laminated toward an axial direction, plural magnet insertion holes are formed at a surface layer portion of a side being opposite to said stator along to a rotation direction and extend toward the axial direction, and each of said plural divided permanent magnets is buried and fixed in each of said magnet insertion holes, wherein the method of manufacturing said permanent magnet rotation type rotary machine comprises of steps:

placing one end ring and said permanent magnet rotor formed by fixing a shaft on said laminated rotor core toward a longitudinal direction;

inserting one plate of said plural divided permanent magnets in each of said plural magnet insertion holes extending in an axial direction over two adjacent divided permanent magnet cores;

pouring a clearance fill-up agent at a vicinity of a central portion of a height direction of each of said plural magnet insertion holes;

inserting another plate of said plural divided permanent magnets in each of said plural magnet insertion holes;

repeating in order about each of said plural magnet insertion holes with a homogeneous flow of said clearance fill-up agent into a clearance which generates in a space of each of said plural divided permanent magnets and each of said plural magnet insertion holes by pumping operation which occurs during an insertion of each of said plural divided permanent magnets into each of said plural magnet insertion holes;

flowing homogeneously said clearance fill-up agent into a whole clearance formed between each of said plural divided permanent magnets and each of said magnet insertion holes; and forming said permanent magnet rotor by fixing another end ring.

10. An electrical vehicle, comprising a permanent magnet rotation type rotary machine having a permanent magnet rotor in which plural permanent magnets are buried in a laminated silicon steel plate; and a stator arranged concentrically to said permanent magnet rotor through a rotation space;

maximum peripheral speed of said permanent magnet rotor being more than 50 m/s, wherein a permanent magnet rotor core has plural magnet insertion holes, each of said plural magnet insertion holes extends on a surface layer portion of said permanent magnet rotor core in an axial direction so as to be divided and is provided along a circumferential direction of the rotor core, each of said plural magnet insertion holes is provided to shift at a predetermined angle toward the circumferential direction;

an area ratio Sc/Sm between a cross-section area Sc of said magnet insertion hole and a cross-section area Sm of aid permanent magnet is a range of 1.02–1.15; and each said plural permanent magnets is arranged in each of said plural magnet insertion holes extending in the axial direction over two adjacent divided permanent magnet cores, each of said plural permanent magnets is fixed to said laminated rotor core through a clearance fill-up agent, said clearance fill-up agent comprises a high polymer material and fills-up a clearance between each of said plural magnet insertion holes and said permanent magnet rotor core; and minimum thickness of an outer peripheral portion of said laminated rotor core at a portion for providing each of said plural magnet insertion holes is more than 1 mm, in which the machine is arranged to constitute a driving power supply of the electric vehicle.

* * * * *